United States Patent [19]

Leppich

[11] 4,111,231

[45] Sep. 5, 1978

[54] SHOCK ABSORBER VALVE

[75] Inventor: Erhard Leppich, Wolfsburg, Fed. Rep. of Germany

[73] Assignee: Volkswagenwerk Aktiengesellschaft, Wolfsburg, Fed. Rep. of Germany

[21] Appl. No.: 747,523

[22] Filed: Dec. 6, 1976

[30] Foreign Application Priority Data

Jan. 12, 1976 [DE] Fed. Rep. of Germany ....... 2600820

[51] Int. Cl.² .................. F16F 9/34; F16K 15/14
[52] U.S. Cl. ..................... 137/852; 137/854; 137/857; 188/322
[58] Field of Search ............ 137/854, 857, 516.15, 137/516.17, 516.19, 516.21, 516.23, 852; 188/317, 322

[56] References Cited

U.S. PATENT DOCUMENTS

| | | | |
|---|---|---|---|
| 1,334,507 | 3/1920 | Shartle | 137/854 X |
| 1,914,495 | 6/1933 | Ferguson | 137/516.23 |
| 3,134,460 | 5/1964 | De Carbon | 137/854 X |
| 3,827,539 | 8/1974 | Fader et al. | 137/854 X |
| 3,837,445 | 9/1974 | Pierle | 188/322 |

Primary Examiner—William R. Cline
Attorney, Agent, or Firm—Brumbaugh, Graves, Donohue & Raymond

[57] ABSTRACT

A valve arrangement adapted for use in a shock absorber, for example of the type employed in motor vehicles. The valve includes a valve seat and at least two disk springs. A first disk spring is clamped in the region of a first radial edge and extends in the radial direction toward the valve seat. However, its second, free radial edge terminates before reaching the valve seat. A second disk spring is held in the region of its own first radial edge against the pressure of the fluid medium only at the region of the second radial edge of the first disk spring. The second disk spring extends in the radial direction toward the valve seat such that its other, second radial edge extends over the valve seat and lies in contact therewith when the valve is closed.

5 Claims, 3 Drawing Figures

SHOCK ABSORBER VALVE

BACKGROUND OF THE INVENTION

This invention relates to disk spring valves for shock absorbers. Shock absorber disk spring valves are usually equipped with a single disk spring which bridges a radial distance between a valve seat and a position on the valve support member to which the spring is mounted. When the disk spring rests against the valve seat it closes fluid passage through the valve support member.

Prior art disk spring shock absorber valves of this type often require individual adjustment to achieve uniform shock absorber characteristics. In addition, the single disk spring may be subject to fatigue after a long period of use.

One prior art shock absorber valve using multiple disk springs is shown in published German Pat. application No. 2,059,682, which shows an arrangement with two disk springs each of which is associated with one direction of fluid flow through the valve support member. Each of the disk springs in this prior valve arrangement therefore acts independently.

It is an object of the present invention to provide a new and improved disk spring valve for a shock absorber.

It is a further object to provide such a disk spring valve with uniform shock absorber characterisitics without the need for individual adjustment of each valve.

It is a still further object of the invention to provide such a disk spring valve with improved durability.

SUMMARY OF THE INVENTION

In accordance with the present invention, there is provided a valve, usable in a shock absorber for controlling flow of a fluid through a valve support member having a fluid passage. The valve includes a first disk spring mounted to the support member by a first radial edge and having a free second radial edge. A valve seat is positioned on the support member radially separated from the second edge. A second disk spring bridges the radial separation and is supported by the second edge of the first disk spring to bear against the valve seat and close the fluid passage.

In order to prevent radial motion of the second disk spring, it may be provided with radial guiding means attached to the support member and to the edge of the second disk spring away from the valve seat. Alternatively, ridges may be provided on one of the disk springs for radial guiding of the second spring. Another technique for radial guiding where the support member includes a cylindrical rod portion concentric to the disk springs is to provide a guiding member which engages the rod portion and is axially displaceable along the rod portion. Improved performance can be achieved by providing a third disk spring arranged between the first and second disk springs.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
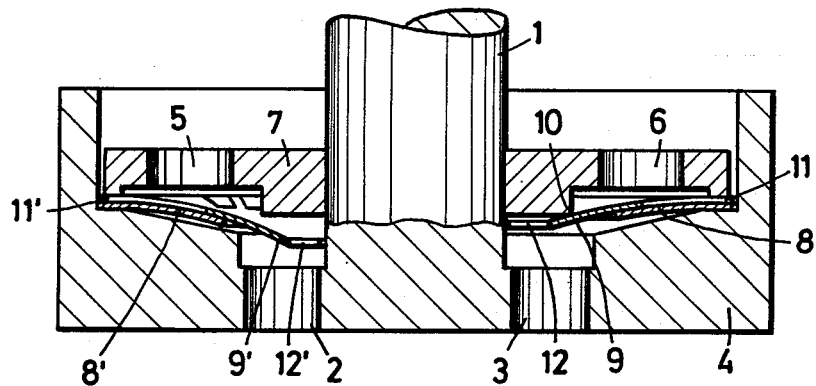
FIG. 1 is a cross-sectional view of a shock absorber valve in accordance with the present invention.

In the cross-sectional view of FIG. 1, there is shown a valve support member 4 which is cylindrical in shape and is provided with a cylindrical rod portion 1. The valve support 4 may act as the piston in a shock absorber, while the cylindrical rod portion 1 acts as a piston rod. In order to simplify the illustration and achieve a better understanding of the invention, there is shown in the cross-sectional view a disk spring valve which is associated only with motion of the piston in one axial direction. Those familiar with shock absorbers will understand that there may be provided two such valve members, one associated with each direction of piston motion.

Support member 4 includes fluid passages 2 and 3 which are arranged to permit flow of shock absorber fluid in a downward direction with respect to support member 4. The right side of the illustration of FIG. 1 shows disk springs 8 and 9 which are in a position whereby access between fluid passage 3 and fluid passage 6 in retaining member 7 is closed. Disk spring 8 is mounted to support member 4 at its outer radial edge 4 by retaining member 7. Disk spring 9 is supported by disk spring 8 such that its inner radial edge bears against valve seat 10.

Figure 2:
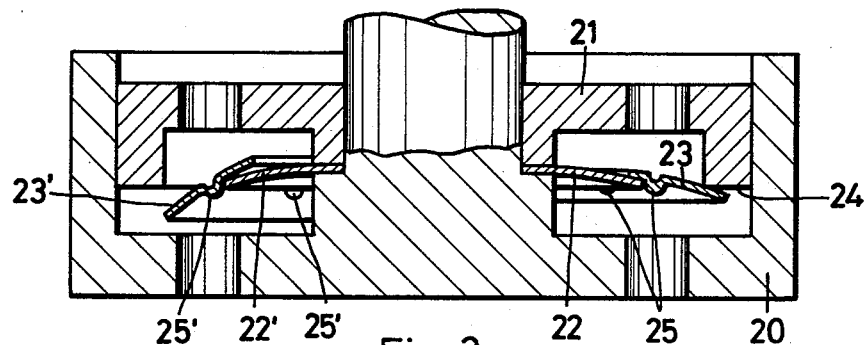
FIG. 2 is a cross-sectional view of another shock absorber valve in accordance with the present invention.
Figure 3:
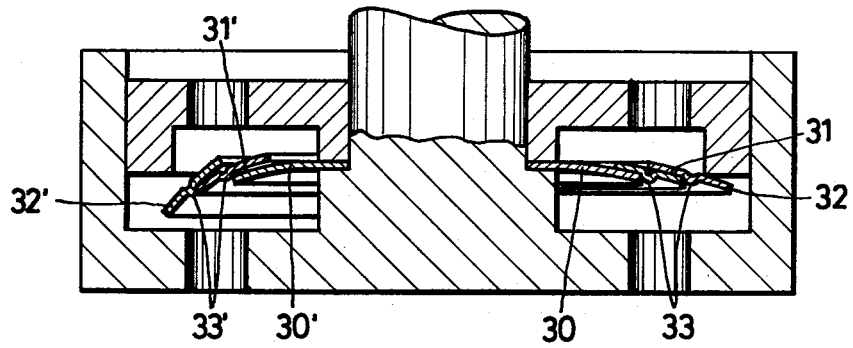
FIG. 3 is a cross-sectional view of a shock absorber valve in accordance with the present invention which contains three disk springs.

When the pressure of fluid in the downward direction in FIG. 1 is sufficient, the valve opens as a result of the bending of the disk springs as indicated on the left side of FIG. 1. Springs 8' and 9' are bent in a direction along their axis so that spring 9' no longer engages valve seat 10, permitting the flow of fluid through passages 2 and 5. FIGS. 2 and 3 also show open valve positions to the left with corresponding elements designated by primed numbers.

In the illustration of FIG. 1, there are shown guiding members 11 and 12, which redundantly prevent radial movement of disk spring 9. Guiding member 11 is connected to the outer edge of disk spring 9 and clamped to support member 4 by retaining member 7. When guiding member 11 is arranged in this manner it preferably exerts only guide forces on disk spring 9 and therefore should have less resilient characteristics then the spring itself.

Guiding member 12 may be provided instead of guiding member 11. Guiding member 12 is connected to the inner edge of disk spring 9 and surrounds rod portion 1 such that member 12 becomes axially displaced along rod portion 1 when the valve is open, as is shown to the left side of FIG. 1. Guiding member 12 must naturally be provided with openings to permit fluid passage through openings 2 and 3 when disk spring 9 is lifted off valve seat 10.

An important feature of the invention is that the disk spring 9 which bears against valve seat 10 is itself supported by another disk spring. This dual spring arrangement provides better uniformity among spring valve characteristics in production without individual valve adjustment, and also provides a valve with better durability.

FIG. 2 is a cross-sectional view of an alternate arrangement in accordance with the invention. Whereas in the FIG. 1 embodiment the outer disk spring 8 is mounted to support member 4 while the inner disk spring 9 engages valve seat 10 in the FIG. 2 arrangement the inner disk spring 22 is mounted to support member 20 by retaining member 21 at its inner edge and outer disk spring 23 engages valve seat 24 at its outer edge.

Radial guiding of the second disk spring 23 in the FIG. 2 embodiment is provided by ridges 25 in the second disk spring 23. Ridges 25 may be provided in either the first or the second disk spring for guiding the edge of one of the springs with respect to the other. Instead of the dimple type ridges 25 shown in the drawing, there may be provided a circular groove to achieve location of one spring with respect to the other.

FIG. 3 is a cross-sectional view of still another embodiment of the invention wherein a third disk spring 31 is provided between the spring 30 which is mounted to the support member and the spring 32 which engages the valve seat. Ridges 33 are provided on springs 31 and 32 to effect radial guiding of the freely mounted springs. The arrangement of FIG. 3 provides a single spring member with multiple pivoting points to provide smooth and predictable valve operation. Those skilled in the art will recognize that more than three disk springs may be provided in accordance with the invention.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

I claim:

1. In a valve, usable in a shock absorber for controlling flow of a fluid through a valve support member having a fluid passage, said valve comprising a valve seat and a plurality of disk springs cooperating therewith, the improvement wherein a first disk spring is clamped in the region of a first radial edge and extends in the radial direction toward said valve seat, its second radial edge terminating before reaching said valve seat and being free to flex in either axial direction, and wherein a second disk spring is held in the region of a first radial edge against the pressure of the fluid medium only at the region of said second radial edge of said first disk spring, the second disk spring extending in the radial direction toward the valve seat such that its other second radial edge extends over said valve seat and lies in contact therewith when the valve is closed.

2. A valve as specified in claim 1 wherein said second disk spring is provided with radial guiding means attached to said support member and to a radial edge of said second disk spring away from said valve seat.

3. A valve as specified in claim 1 wherein ridges are provided on at least one of said disk springs for radial guiding of said second disk spring.

4. A valve as specified in claim 1 wherein said support member includes a cylindrical rod portion concentric to said first disk spring and wherein the inner radial edge of said second disk spring is provided with radial guiding means engaging said rod portion and axially displaceable along said rod portion.

5. A valve as specified in claim 1 wherein there is provided at least one third disk spring arranged between said first and second disk springs.

* * * * *